United States Patent [19]

Marcovich et al.

[11] 4,202,736
[45] May 13, 1980

[54] PROCESS AND APPARATUS FOR THE THOROUGH PURIFICATION OF WATER AND THE HIGHLY PURIFIED WATER OBTAINED THEREBY

[75] Inventors: Herbert S. Marcovich, Saint-Cloud; Remi D. Perrin, Paris, both of France

[73] Assignee: Institut Pasteur, Paris, France

[21] Appl. No.: 806,271

[22] Filed: Jun. 13, 1977

[30] Foreign Application Priority Data

Jun. 15, 1976 [FR] France .................................. 76 18150

[51] Int. Cl.² .................................................. B01D 3/02
[52] U.S. Cl. ........................................ 203/10; 203/12; 203/86; 203/100; 202/182; 202/235
[58] Field of Search .................... 203/10, 12, 40, 41, 203/86, 100; 202/182, 197, 198, 200, 235; 159/2 R, DIG. 2, DIG. 27, DIG. 28; 422/307

[56] References Cited

U.S. PATENT DOCUMENTS

| 2,698,286 | 12/1954 | Bircher | 203/12 |
| 3,736,234 | 5/1973 | Miyamoto | 202/197 |

FOREIGN PATENT DOCUMENTS

954065 9/1974 Canada.
4897 of 1913 United Kingdom.

OTHER PUBLICATIONS

The Condensed Chemical Dictionary–Hawley 8th Ed., Van Nostand Reinholdlo NY., 1971,

*Primary Examiner*—Hiram H. Bernstein
*Attorney, Agent, or Firm*—Berman, Aisenberg & Platt

[57] ABSTRACT

The water is heated to convert it into steam; the steam is passed from a container into a superheating zone and then condensed in the form of purified water. The superheating zone contains at least in part, a packing of a material inert with respect to steam and impurities possibly present in the latter. The steam is superheated in said zone by means of supplementary heating to a temperature exceeding 300° C., and reaching notably from 400° to 700° C., preferably from 500° to 700° C. Highly purified apyrogenic water freed from undesired organic substances, useful in research in physical chemistry, physics, biochemistry or molecular biology or in the medical field is, produced by this process.

31 Claims, 1 Drawing Figure

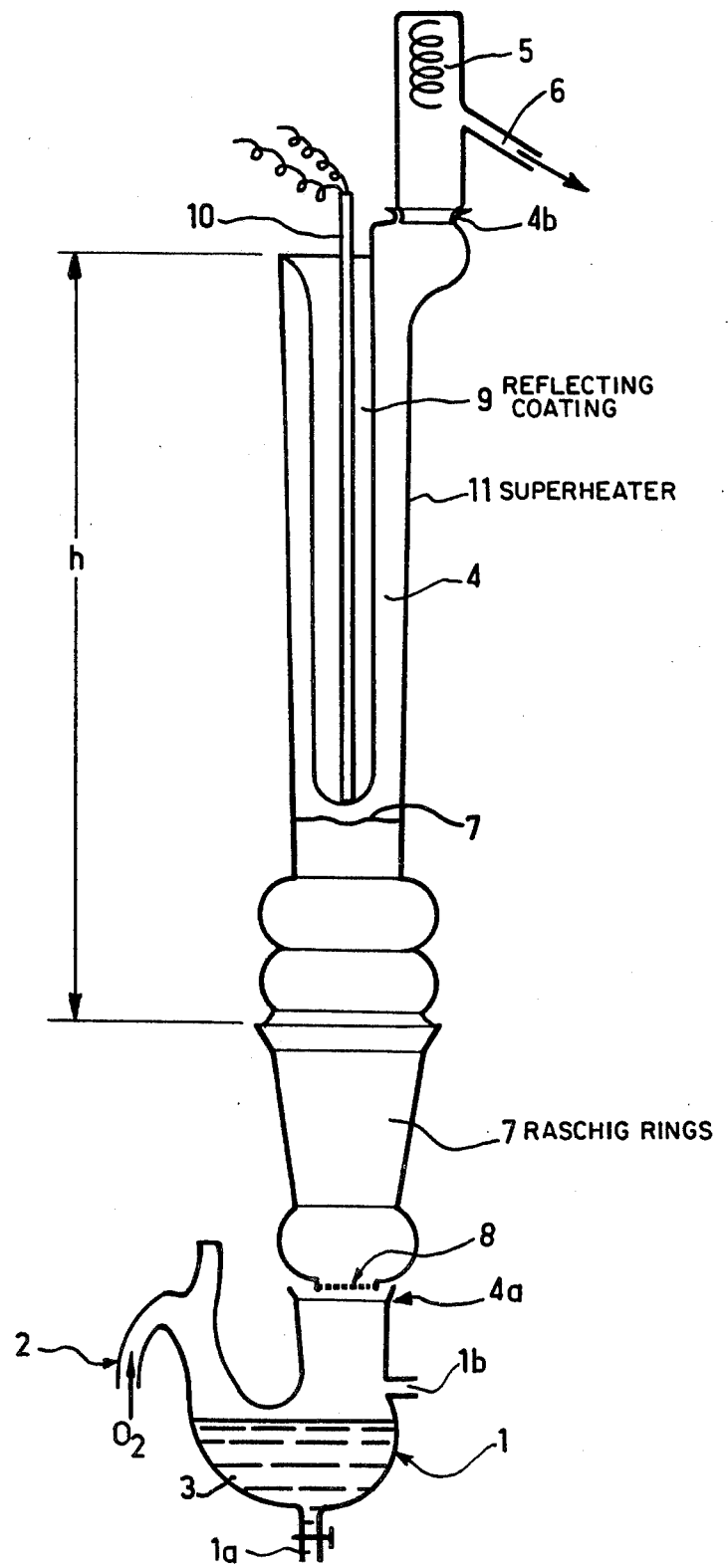

PROCESS AND APPARATUS FOR THE THOROUGH PURIFICATION OF WATER AND THE HIGHLY PURIFIED WATER OBTAINED THEREBY

BACKGROUND OF THE INVENTION

1. Field of the Invention

The invention relates to the purification of water and to obtaining water which is apyrogenic and freed from essentially organic substances capable of interfering with research of a biological, physico-chemical, or physical phenomenon or spoiling medico-sanitary practice.

2. Description of the Prior Art

Numerous installations are already known which enable the manufacture of distilled water on a larger or smaller scale. Complete plants enable, for example, the desalination of sea water by distillation of the latter. Laboratory equipment produces deionised distilled water suitable in numerous applications.

However, known technology goes not permit obtaining water which is essentially pure and, in particular, free of previously-noted contaminants as defined above. The latter are entrained during distillation of water, of which the steam, on condensation, supplies so-called purified water, which still contains a certain amount of substances carried through the distillation. It is desirable to obtain an apyrogenic water, free of essentially organic contaminants and of ions and having a biological innocuousness, notably for very exacting requirements.

Thus the invention relates to improvements in the general technique of water distillation, for the purification of the latter.

By way of document illustrating the state of the art, GB Pat. No. 4897 AD 1912 may be mentioned. This patent relates to a small portable device for distilling and sterilising liquids, such as water. It is proposed to destroy bacteria detained in water by causing the steam to pass, before condensation, into a superheating zone constituted by a simple tube connecting the still to a condensing receiver. Such a device does not permit practically complete removal of the organic substances from the water. Simple superheating by means of a flame or of a resistance around the tube in which the steam flows is not sufficient to remove organic substances. This patent does not describe any means for rendering the heating homogeneous in the superheated zone, nor the possibility of regulating, in a controlled manner, the dwell time of the steam in this zone.

It is an object of the present invention, on the other hand, to remove almost completely, the organic substances contained in the water. Organic impurities are the most troublesome contaminants in certain applications, for example in molecular biology or in genetics, since, by reason of the precision of modern biology, the least organic impurity contained in the aqueous medium, results in errors and false results. The very particular needs of biology require the utilisation of water free of organic impurities. Water which is presently available and reputed to be very pure is, mostly, characterised by its properties of conductivity or of pH, but these values are of no help in the problem resolved by the invention, considering that organic substances are non-conducting. Water meeting the most exacting requirements as regards conductivity is inept for biological requirements.

At the present time, for such water, water from natural sources is used, or it is necessary to distill water several times in quartz, after having previously treated it with potassium permangenate. This bidistillation is relatively expensive, but it does not provide a completely satisfactory water for biological needs.

Another known process for purifying water consists of freeing it from ions that it contains by passing it through diaphragms or filters of very low porosity. Specialists who work in the biological field, for example in molecular biology, for in vitro syntheses know that water obtained in this manner is not suitable for their requirements. It still contains too high an amount of organic residues which generally reach some milligrams per liter.

SUMMARY OF THE INVENTION

It is an object of the invention to provide a process for obtaining water practically devoid of organic residues by a one-step process.

It is also an object of the invention to provide water with an organic-substance content which is much less than that of the purest water presently available and even that of water taken as a reference, such as water drawn by drilling to 3,000 meters below the Greenland icecap.

It is also an object of the invention to provide a process and apparatus enabling production of entirely reliable highly purified water which is suitable for the most exacting requirements of modern biology.

It is a further object of the invention to provide, for the production of such water, apparatus whose energy consumption per liter of water is similar to that of apparatus presently used for the bidistillation of water.

According to the most general aspect of the invention, there is provided a process for purifying water to a high degree of purity by distillation to ensure the innocuousness and non-toxicity of the water in appropriate applications. According to the process water is heated to convert it into steam, which is condensed and collected in the form of purified water, said process being characterised by passing the steam (which can still contain, e.g., notably organic, impurities), before condensation, into a superheating zone advantageously containing, as least in part, a packing of a material which is inert with respect to the steam and the impurities possibly present in the latter, the steam being superheated in said zone, by means of supplementary heat, to a temperature exceeding 300° C. and reaching notably, from 400° to 500° C. and, preferably, from 500° to 700° C.

According to another aspect the invention provides apparatus (for the purification of water to a high degree of purity, by distillation, in order to ensure the innocuousness and the non-toxicity of the water in suitable applications) comprising a container for the water to be purified, means for heating the water, a reflux condenser connected to said container and at least one tubulation for the recovery of the purified water, said apparatus being characterised by a superheater (mounted between the container and the reflux condenser) which advantageously contains, at least in part, a packing of material which is inert with respect to the steam and to the impurities, notably organic, present in the latter as well as means for bringing heat to the superheater, so that the temperature of the steam in the latter is at least equal to 300° C., notably from 400° to 700° C., and preferably from 500° to 700° C.

In a preferred embodiment of the invention the superheating zone is a column inserted between the container receiving the water to be purified and the reflux condenser. This column can be void of material, on condition that it provides a sufficient path for the steam, but it is advantageous to insert in the column packing material (inert with respect to the steam and to substance that steam is capable of entraining) such as transparent fused silica or any other inert and possibly opaque substance, since an important factor is the emission of photons corresponding to a black body brought to this temperature.

The function of this packing is to permit a sufficient length of travel, so that the steam is present in the superheated zone for the necessary time and with homogeneous temperature distribution during the whole of its dwell time therein.

As a modification, it is also possible to insert in the superheating column, a catalyst facilitating the destruction of organic substances at high temperature. Suitable catalysts of this type are, for example, platinum sponge, alumina, etc. ...

According to another supplementary feature of the invention, it is possible to introduce an oxidising agent, such as oxygen, into the container containing the water to be distilled, in order to ensure also, if necessary, the degradation of interfering organic substances in the zone wherein the steam is superheated, according to the invention, and in order to ensure the innocuousness of the water.

According to a fundamental feature of the invention, a superheating zone or column is used within which the steam is brought to a sufficient temperature to ensure the innocuousness of the water in applications, such as defined below. For this purpose, the column is heated by any suitable heat source, which does not exert a contaminating effect on the steam and which permits the steam to be brought to an average temperature above 300° C. and preferably of the order of 500° to 700° C.

According to the invention, the minimum temperature in the superheating zone of the steam is 300° C.

The preferred range of temperature is situated between 550° and 650° C. It does not seem to be advantageous to heat the steam to very high temperatures, for example to temperatures higher than 1,000° or 1100° C. At such temperatures there may be observed an entrainment of particles derived from the packing, for example silica, if the packing is of quartz.

According to an essential feature of the invention it is convenient to use superheating zones containing packing, and to regulate the dwell time of the steam, taking into account the temperature selected in the superheating zone. The time-temperature combination must be varied as necessary by selecting longer dwell times when the temperatures are situated at values below the above ranges, the preferred range of temperature being, as previously stated, in the order of from 550° to 650° C.

The means for supplying heat to the superheated zone may be arranged inside or outside the latter. In a preferred embodiment, these means consist of a radiating device, such as a tungsten filament, positioned in the axis of the column and surrounded by a jacket made of a material inert with respect to steam, such as silica. The filament may be brought to a temperature of 500° C. to 2000° C. or to any temperature enabling the suitable superheating of the steam.

Thus, as previously stated, the superheating column, according to a preferred embodiment of the invention, also comprises a packing which has a function of ensuring the mixing of the steam and of the substances carried with it as well as the uniform distribution of the heat. This packing also has the function of ensuring sufficient dwell time in the apparatus of the steam and of the substances entrained with it.

Advantageously, a material is used whose coefficient of expansion is low, whose thermal conductivity is excellent and whose transparency to the photons corresponding to the previously-defined temperatures is very good. The material of which the column is constituted must also be inert under the conditions of use and possess a high melting point. The preferred material according to the invention, is fused silica which is preferably transparent. Very little fused silica is carried over by the steam under the temperature conditions existing inside the column. However, the presence of a certain amount of silica in the water at the outlet of the apparatus is acceptable according to the applications. In the preferred apparatus, elements of transparent fused silica are advantageously used, ensuring a random distribution of steam flow. The technician skilled in the art will select elements, according to particular requirements, so as to increase the path of the steam in the superheated zone, as well as its mixing and consequently its heating, as homogeneously as possible.

In order to avoid excessive heat losses at the level of the superheated zone, it is preferably for the latter to be equipped with thermal insulating means. Thus, if the heating is effected by means of an internal heat source, the superheating column is coated externally with a layer ensuring good thermal insulation, for example a gold plating reflecting infrared radiation with respect to the outside, in order to reduce calorific losses to a minimum.

Due to the means proposed by the invention, superheating the steam is effected during its passage in the column, which has the effect to ensuring the innocuousness of the water by ridding it of organic substances possibly entrained in the steam derived from the water to be purified. By means of the high temperatures applied, which, as has been noted previously, are always higher than 300° C. and advantageously of the order of 500° to 700° C., a very thorough removal of undesired organic waste substances is achieved. This characteristic of the water is made possible, according to the invention, by the combined utilisation of a lining of a suitable material, such as a transparent fused silica, and of a high temperature, for example of the order of 500° to 700° C.

The invention thus enables the preparation of a water which is apyrogenic and freed from undesired organic substances, such water being useful in physical chemistry, in physics, in biochemistry in molecular biology or in the medical field, for example for cell cultivation, for delicate enzymological studies and for injectable solutions, solutions used in hemodialysis and in perfusion.

In the sense of the present description, it is said that the water is apyrogenic if it does not cause undesirable secondary phenomena when it is placed in contact with living cells. These phenomena are generally associated with the presence of endotoxins. An apyrogenic water obtained according to the invention is hence particularly free of endotoxins. To avoid subsequent contamination of the water collected by distillation, provision is made to receive the water in a heated flask (for example at around 80° C.). A suitable means for checking the apyrogenicity of the water consists of carrying out the test described in the European Pharmocopea, volume 2 (1971) pages 58 to 60.

According to an essential characteristic, it is possible to define the water purified according to the invention as being water free of undesired organic substances and, more accurately, not containing more than 0.1 mg/l of said substances. A simple means for measuring the content of organic substances of water consists of freeze drying the water to be analysed and weighing the residue of the freeze drying. So-called "purified" waters presently commercially available still titrate 1 mg/l and sometimes up to 3 mg/l of organic substances.

The technician skilled in the art will adapt to his particular needs the conditions of application of the process according to the invention. For example, in certain applications, a slight silica content in the obtained water does not constitute a drawback.

The previously described tests and measurements to evaluate the apyrogenicity of the water and to determine its content of organic substances serve as checking means for the specialist, who, according to the type of installation available to him, will be able to select the parameters of the process accordingly. For a given apparatus, the dwell time of the steam in the superheater represents an important parameter. Taking into account the temperature existing inside the superheater and the presence of packing, for example of fused silica, the water flow rate should then be adjusted so that the dwell time is sufficient. This can be checked by proceeding with measurements on samples taken in the course of prior routine tests.

Thus, in an apparatus comprising a superheater with internal heating in the order of 600° C. at 500 to 1000 watts with a heating column height of about 50 cm and for a volume of 1 ml of water to be treated, it has been found that an effective dwell time is of the order of 0.05 to 0.2 min. for a steam temperature of the order of from 550° C.–600° C. The steam to be treated flows in the superheater with a flow rate of 0.01 to 0.1 ml/minute for a temperature in the order of from 550° C.–600° C. It is self-evident that these data are provided purely by way of illustration and vary according to the arrangement of the heat source inside or outside of the superheating column, the sole condition to be achieved being that the temperature of the steam inside said column to be at least equal to 300° C.

DESCRIPTION OF A PREFERRED EMBODIMENT

The invention will be exemplified without being limited in any way by an embodiment whose description is given with reference to the single FIGURE of the accompanying drawing, which shows diagrammatically an apparatus according to the invention.

As shown in the drawing, the apparatus comprises a container which can serve as a boiler for the unpurified water. In the embodiment illustrated in the drawing, the container is a flask 1 provided with a lateral tubulation 2, serving for the possible introduction of oxygen which bubbles through the midst of the mass of water 3, before being carried over by the steam. Conventional heating means (not shown) provide for the boiling of the water in the container 1. At 1a a drain cock, serving for cleaning the flask, is shown and, at 1b, is a tubulation which can serve for continuously supplying water to be purified. It is clear in fact that the invention easily lends itself to continuous operation of the distillation.

According to the invention, a superheating column 4 is mounted on the container 1 by the lower part of 4a of the column. The upper part 4b of the column is connected to a conventional reflux condenser 5, at the lower part of which a tubulation 6 is provided to collect the very pure water flowing out of the apparatus.

The means provided by the invention consist essentially of the superheater 4 which will now be described. As shown in the drawing, the column 4 is filled with transparent fused silica in the form of Raschig rings 7, supported by a grid 8 and which can be extended over a height greater than that 7' appearing in the drawing.

In the axis of the column is mounted a heat source 9 which, in the example shown, is a source of infrared rays with a heating height h of 50 cm. The device 9 is shown in the form of a glove-finger shaped sheath, of transparent silica, which isolates it from the steam and is supplied at 10 in known manner. In the embodiment described, the source in infra-red radiation was that marketed by the Heraeus Company as element number 2KB, operating at 110 volts.

Lastly, the outside of the column 4 is provided with a reflecting coating 11 which, in the example chosen, is a gold plating surrounding the column.

The operation of the apparatus according to the invention is simple since it amounts to an improved distillation apparatus. The steam (coming from the container 1 and possibly charged with impurities) passes over the pieces of transparent fused silica 7 and through the column 4 where it is superheated by means of the heat source 9 to a temperature of from 500° to 700° C. The steam thus becomes purified from any undesired organic substances which are possibly carried over with it at the boiling point in the container 1, whose temperature is in the vicinity of 100° C. The oxygen led in through the tubulation 2 assists, if the heat is insufficient, in the destruction of undesired organic substances in the column 4 by acting as an oxidising agent. It is thus possible to collect at 6 a water whose content of organic substances is less than 0.1 mg/l, whereas so-called purified water (presently available commercially) has a content equal to or higher than 1 mg/l.

Experimental trials were carried out to illustrate the possibilities of application of the water purified according to the invention, and it has been found that it can be utilised notably for the cultivation of fibroblasts. Comparative tests were carried out with normally commercially available water designated as highly purified and with the water produced according to the invention. It was specified that the other components of the culture medium utilised in the two cases be identical. Quantitatively, it was observed, in the case of the water according to the invention, that there was a drastic reduction in the number of storage granules occurring in the fibroblasts, which indicates a decrease in the toxicity of the culture medium.

A decrease in the number of storage granules can hence be attributed to the use of water of better quality and of greater innocuousness.

Comparative tests were also carried out for investigations of the embryogenesis of the mouse egg, on the differentiation of the myoblast and for the cultivation of macrophages. These various studies necessitate material of very high purity and of very great innocuousness.

In all cases, it was found that the water according to the invention had considerable advantages for research and cultivation of the various biological models noted above.

Specimens of water produced by the process according to the invention were subjected to various tests.

First Test Method: Emission Spectrography

The spectrographic analysis results are expressed by the concentrations in the sample analysed of elements in Table I, expressed in $\mu g\ l^{-1}$.

TABLE I

| Spectrographic Analysis | | | | | | | | | |
|---|---|---|---|---|---|---|---|---|---|
| Ag | Al | Ba | Be | Bi | Ca | Cd | Co | Cr | Cu |
| <2 | ▸2 | <3 | <2 | <1 | 3 | <1 | <2 | <1 | <1 |
| Fe | Mg | Mn | Mo | Ni | Pb | Si | Sn | Ti | V |
| ≦2 | ≦1 | <1 | <2 | <2 | <2 | 25 | <2 | <1 | <1 |
| | | | | Zn | Zr | | | | |
| | | | | <2 | <1 | | | | |

The sign ≦ indicates that the content of the element concerned is of the order of the value indicated, but cannot be specified further on account of the blanks.

The sign < indicates that the element was sought but not characterised and that, if it was present, it was in a content less than the content indicated.

For silicon, the value indicated is an average value; the content observed varying from 15 to 50 ppb according to the portions sampled.

Second test method: pyrolysis

In this method, a determination was made of the chlorine-containing volatile substances of the haloform type as well as the dehaloform precursors. The precursors are organic compounds which give haloform compounds after chlorination. This method permits the determination of typical organic substances which codistill with water. It is to be noted that known processes for purifying water, which enable mineral substances to be eliminated very effectively, cannot remove such organic substances. Known processes are based on ion exchange, distillation, reverse osmosis or on a combination of an ion exchange or reverse osmosis step followed by distillation in a quartz apparatus.

RESULTS OF MEASUREMENTS (A) Determination of volatile organo-halogen compounds

TABLE II

| | $CH_2BrCl$ | $CHCl_3$ | $CH_2ClCH_2Cl$ | $CHBrCl_2$ | $CHBr_2Cl$ | $CHBr_3$ | $CCl_4$ |
|---|---|---|---|---|---|---|---|
| Sample of water according to the invention | 0 | 0 | 0 | 0 | 0 | 0 | 0 |
| Detection limit | 0.1 μg/l | 0.1 μg/l | 1 μg | 1 μg | 2 μg | 5 μg | 0.05 μg |

The above results show that the water according to the invention is free of organo-halogen compounds although these are very difficult to remove.

(B) Determination of "haloform precursors"

Demonstration of the existence of these precursors is effected after chlorination of the water by 5 mg/l of chlorine and titration of the volatile organo-chlorine compounds formed.

The detection limits are identical with those mentioned above.

TABLE III

| | $CH_2BrCl$ | $CHCl_3$ | $CH_2ClCH_2Cl$ | $CHBrCl_2$ | $CHBr_2Cl$ | $CHBr_3$ | $CCl_3$ |
|---|---|---|---|---|---|---|---|
| Water according to the invention chlorinated with 5 ppm $Cl_2$, contact time 2h | 0 | 0 | 0 | 0 | 0 | 0 | 0 |

The analysis did not show the presence of this type of halogen precursor compound.

CONCLUSION

This water is devoid of volatile organic compounds or of compounds capable of producing them after chlorination.

The invention is naturally not limited by the examples described above with reference to the accompanying drawing. In the latter, the superheater is a column of transparent fused silica, on the axis of which is a jacket (also of transparent silica) which permits the housing of a tungsten filament emitter which can be heated by the passage of an electric current to between 2000° C. and any lower temperature. The heated steam is not in contact with the emitter for simple reasons of technical convenience. As a modification, it is possible to provide also for this emitter to be immersed directly in the steam, due to the fact that its wall is of fused silica. Such a device only constitutes one possible solution for the heating of the steam. It is also possible to arrange a platinum resistance (traversed by an electric current) inside the superheater in the steam flow zone. It is possible, of course, to replace the infrared heating device by any other suitable heat source.

The previously-described apparatus, by way of example, can also include, by way of addition, a trap mounted on the upper part 4b and designed to collect the particles of silica possibly carried over.

Moreover, the above embodiment of the invention is described as being constituted of quartz, but it could also be formed of any material (other than quartz) which is inert from the chemical point of view under the conditions of operation. In this respect, an apparatus of titanium could be suitable.

Finally, it should be noted that the utilisation of oxygen in the container containing the water to be distilled or that of a catalyst in the superheating zone is in no way indispensable for obtaining water having the desired purity.

Other modifications and changes could be made without departing from the spirit and scope of the invention. It is intended therefore to cover, in the appended claims, all such changes and modifications which are within the scope of the invention.

I claim:

1. A distillation process for producing apyrogenic water which comprises the following steps:
   (a) introducing water into a heating zone,
   (b) heating the water in the heating zone to convert it into steam,
   (c) superheating the steam to a temperature within a range exceeding 300° C. and up to 700° C.,
   (d) concurrently with step (c), passing the steam over and between packing material inert at the temperature with respect to said steam and to any impurities therein and thus maintaining the steam at said temperature for a dwell time sufficient to produce apyrogenic water, and
   (e) condensing the superheated steam into apyrogenic water.

2. A process according to claim 1 which consists essentially of steps (a), (b), (c), (d) and (e).

3. A process according to claim 1 wherein the temperature range for step (c) is from 400° to 700° C.

4. A process according to claim 1 wherein said temperature range is from 500° to 700° C.

5. A process according to claim 1 which comprises contacting the water of step (b) with an agent for oxidising any undesired organic substance in said water during steps (c) and (d).

6. A process according to claim 5 wherein the oxidising agent is oxygen.

7. A process according to claim 1 wherein step (c) comprises superheating the steam in contact with a catalyst for facilitating destruction of any organic substance entrained in said steam.

8. A process according to claim 7 wherein the catalyst comprises platinum sponge.

9. A process according to claim 7 wherein the catalyst comprises alumina.

10. A process according to claim 1 wherein step (a) comprises introducing the water at a flow rate and the purified water condensed in step (e) is collected at a flow rate, which process further comprises adjusting the flow rate of introducing the water in step (a), adjusting the flow rate of collecting purified water from step (e), adjusting the temperature for superheating the steam in step (c) and maintaining the steam at that temperature for a dwell time which, at the adjusted flow rates and temperature, is sufficient to obtain water having desired apyrogeneity and a minimum organic-substance content.

11. A process according to claim 34 wherein the dwell time is in the order of from 0.05 to 0.2 minute at a temperature of from about 400° to about 700° C.

12. A single-distillation process according to claim 1.

13. A distillation process according to claim 1 for obtaining water having at most 0.1 mg/l of organic substance, as determined after freeze drying, and wherein the dwell time of step (d) is sufficient to produce water of such purity at the dwell temperature.

14. A single-distillation process according to claim 13.

15. A single-distillation process according to claim 1 wherein the dwell time of step (d) is for a period of from 0.05 to 0.2 minute.

16. Distillation apparatus for purifying water to a high degree which comprises:
   (a) container means for containing water being vaporized into steam,
   (b) charging means for introducing water into the container means,
   (c) condensing means to condense steam into purified water,
   (d) conduit means to provide a flow path for conducting steam to the condensing means for the container means,
   (e) heating means for superheating steam in the conduit means to a temperature in the range of from above 300° up to 700° C., and
   (f) packing means in the conduit means to increase the flow path of steam superheated by heating means (e) and to maintain steam in the conduit means at the temperature and for a dwell time sufficient to yield apyrogenic water.

17. Apparatus according to claim 16 wherein the condensing means is a reflux condenser, and the packing means is inert with respect to steam and to any impurities therein.

18. Apparatus according to claim 16 which further comprises means to recover purified water condensed in the condensing means.

19. Apparatus according to claim 16 wherein the heating means is means to maintain steam in the conduit means at a temperature within the range of from 400° to 700° C.

20. Apparatus according to claim 16 wherein the heating means is within the conduit means.

21. Apparatus according to claim 50 wherein said heating means is a radiating device.

22. Apparatus according to claim 21 wherein the conduit means is a column having an axis, the radiating device comprises a tungsten filament located in the axis of the column and surrounded by a jacket of packing means which are inert with respect to steam.

23. Apparatus according to claim 22 wherein the packing means are of silica.

24. Apparatus according to claim 20 wherein the heating means comprises a platinum resistance traversed by an electrical current.

25. Apparatus according to claim 16 wherein the packing means is of a material which is inert with respect to steam and substances entrained therein, the material being characterised by emission of photons corresponding to a black body at the temperature to which the heating means brings superheated steam.

26. Apparatus according to claim 25 wherein the material is transparent fused silica.

27. Apparatus according to claim 25 wherein the material is an opaque inert substance.

28. Apparatus according to claim 25 wherein the packing means has a low coefficient of expansion, excellent thermal conductivity and very high transparency to photons.

29. Apparatus according to claim 16 comprising thermal insulating means for the conduit means.

30. Apparatus according to claim 29 wherein the conduit means is a column coated externally with means to provide good thermal insulation and the heating means is within the column.

31. Apparatus according to claim 30 wherein the means to provide good thermal insulation is a coating layer of gold plating.

* * * * *